United States Patent
Kairali et al.

(10) Patent No.: US 12,395,515 B2
(45) Date of Patent: Aug. 19, 2025

(54) DYNAMICALLY PLACING TASKS INTO EDGE NODES BASED ON REPUTATION SCORES

(71) Applicant: International Business Machines Corporation, Armonk, NY (US)

(72) Inventors: Sudheesh S. Kairali, Kozhikode (IN); Sarbajit K. Rakshit, Kolkata (IN); Binoy Thomas, Kozhikode (IN); Lakshmi K R, Kochi (IN)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 18/117,987

(22) Filed: Mar. 6, 2023

(65) Prior Publication Data
US 2024/0305659 A1    Sep. 12, 2024

(51) Int. Cl.
*H04L 29/00*    (2006.01)
*H04L 9/40*    (2022.01)

(52) U.S. Cl.
CPC .................. *H04L 63/1433* (2013.01)

(58) Field of Classification Search
CPC ....... H04L 63/1433; H04L 67/51; H04L 9/50; H04L 41/5009; H04L 67/10; H04L 41/5019; H04L 67/12; H04L 41/5058
See application file for complete search history.

(56) References Cited

U.S. PATENT DOCUMENTS

| | | | | |
|---|---|---|---|---|
| 6,341,311 | B1* | 1/2002 | Smith | H04L 9/40 |
| | | | | 707/E17.12 |
| 11,108,662 | B2* | 8/2021 | Li | H04L 43/16 |
| 11,144,340 | B2* | 10/2021 | Warnicke | G06F 9/5083 |

(Continued)

FOREIGN PATENT DOCUMENTS

| | | |
|---|---|---|
| CN | 114827153 A | 7/2022 |
| CN | 114864069 A | 8/2022 |

OTHER PUBLICATIONS

Gonzalez et al., "Edge computing architecture and use cases," IBM Developer, Feb. 17, 2020, 21 pages, retrieved from https://developer.ibm.com/articles/edge-computing-architecture-and-use-cases/.

(Continued)

*Primary Examiner* — Don G Zhao
(74) *Attorney, Agent, or Firm* — Zilka-Kotab, P.C.

(57) ABSTRACT

A computer-implemented method, according to one embodiment, includes dynamically assigning reputation scores to a plurality of tasks, and dynamically assigning reputation scores to a plurality of edge nodes. The method further includes dynamically placing the tasks into the edge nodes based on the reputation scores assigned to the tasks and the reputation scores assigned to the edge nodes. A computer program product, according to one embodiment, includes a computer readable storage medium having program instructions embodied therewith. The program instructions are readable and/or executable by a computer to cause the computer to perform the foregoing method. A system, according to another embodiment, includes a processor, and logic integrated with the processor, executable by the processor, or integrated with and executable by the processor. The logic is configured to perform the foregoing method.

20 Claims, 3 Drawing Sheets

(56) References Cited

U.S. PATENT DOCUMENTS

| | | | |
|---|---|---|---|
| 11,743,282 B1* | 8/2023 | Torkamani | G06N 20/00 |
| | | | 726/25 |
| 2015/0207809 A1* | 7/2015 | Macaulay | H04L 63/1433 |
| | | | 726/22 |
| 2015/0304372 A1* | 10/2015 | Catz | H04M 3/22 |
| | | | 709/204 |
| 2016/0065598 A1* | 3/2016 | Modi | H04L 63/1408 |
| | | | 726/23 |
| 2016/0210049 A1* | 7/2016 | van Riel | G06F 11/3452 |
| 2017/0230733 A1* | 8/2017 | Rana | H04Q 9/00 |
| 2019/0140919 A1* | 5/2019 | Smith | H04L 67/51 |
| 2019/0361926 A1* | 11/2019 | Rogynskyy | G06F 16/2365 |
| 2021/0021619 A1* | 1/2021 | Smith | H04L 63/145 |
| 2021/0109830 A1* | 4/2021 | Venugopal | H04L 67/10 |
| 2021/0165969 A1* | 6/2021 | Galitsky | G06F 40/30 |
| 2022/0114251 A1* | 4/2022 | Guim Bernat | G06F 9/44505 |
| 2022/0131844 A1* | 4/2022 | Sherlock | H04L 63/105 |
| 2022/0156776 A1* | 5/2022 | Long | G06Q 30/0215 |
| 2022/0210151 A1* | 6/2022 | Williams | H04L 63/0861 |
| 2024/0013562 A1* | 1/2024 | Montero | G06V 30/19187 |
| 2024/0249211 A1* | 7/2024 | Robison | G06Q 10/0635 |

OTHER PUBLICATIONS

Renjan et al., "DAbR: Dynamic Attribute-based Reputation scoring for Malicious IP Address Detection," IEEE, 2018, 6 pages.
Wikipedia, "Task (computing)," Wikipedia, 2022, 4 pages, retrieved from https://en.wikipedia.org/wiki/Task_(computing)#:~:text=In%20computing%2C%20a%20task%20is,or%20query%20(for%20work).

* cited by examiner

DYNAMICALLY PLACING TASKS INTO EDGE NODES BASED ON REPUTATION SCORES

BACKGROUND

The present invention relates to edge computing, and more specifically, this invention relates to dynamically placing tasks into edge nodes based on reputation scores assigned to the tasks and reputation scores assigned to edge nodes.

Networks, which may include cloud computing networks, typically include a plurality of computing devices. For example, computing devices may include, e.g., computers, processors, phones, printers, controllable mechanisms, thermostats, sensors, etc.

Edge computing includes technologies and techniques that utilize computing resources that are available outside of traditional and cloud data centers such that a workload is placed closer to where data is created and such that actions can then be taken in response to an analysis of that data. For context, within an edge ecosystem, clouds, which may be public or private clouds, may serve as a repository for container-based workloads like applications and machine learning models. An edge device is a special-purpose piece of equipment that also has compute capacity that is integrated into that device. Furthermore, an edge node is a generic way of referring to any edge device, edge server, or edge gateway on which edge computing can be performed. Meanwhile, an edge cluster/server is a general-purpose IT computer that is located in a remote operations facility such as a factory, retail store, hotel, distribution center, or bank. Yet furthermore, an edge gateway is typically an edge cluster/server which, in addition to being able to host enterprise application workloads and shared services, also has services that perform network functions such as protocol translation, network termination, tunneling, firewall protection, or wireless connection.

SUMMARY

A computer-implemented method, according to one embodiment, includes dynamically assigning reputation scores to a plurality of tasks, and dynamically assigning reputation scores to a plurality of edge nodes. The method further includes dynamically placing the tasks into the edge nodes based on the reputation scores assigned to the tasks and the reputation scores assigned to the edge nodes.

A computer program product, according to one embodiment, includes a computer readable storage medium having program instructions embodied therewith. The program instructions are readable and/or executable by a computer to cause the computer to perform the foregoing method.

A system, according to another embodiment, includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
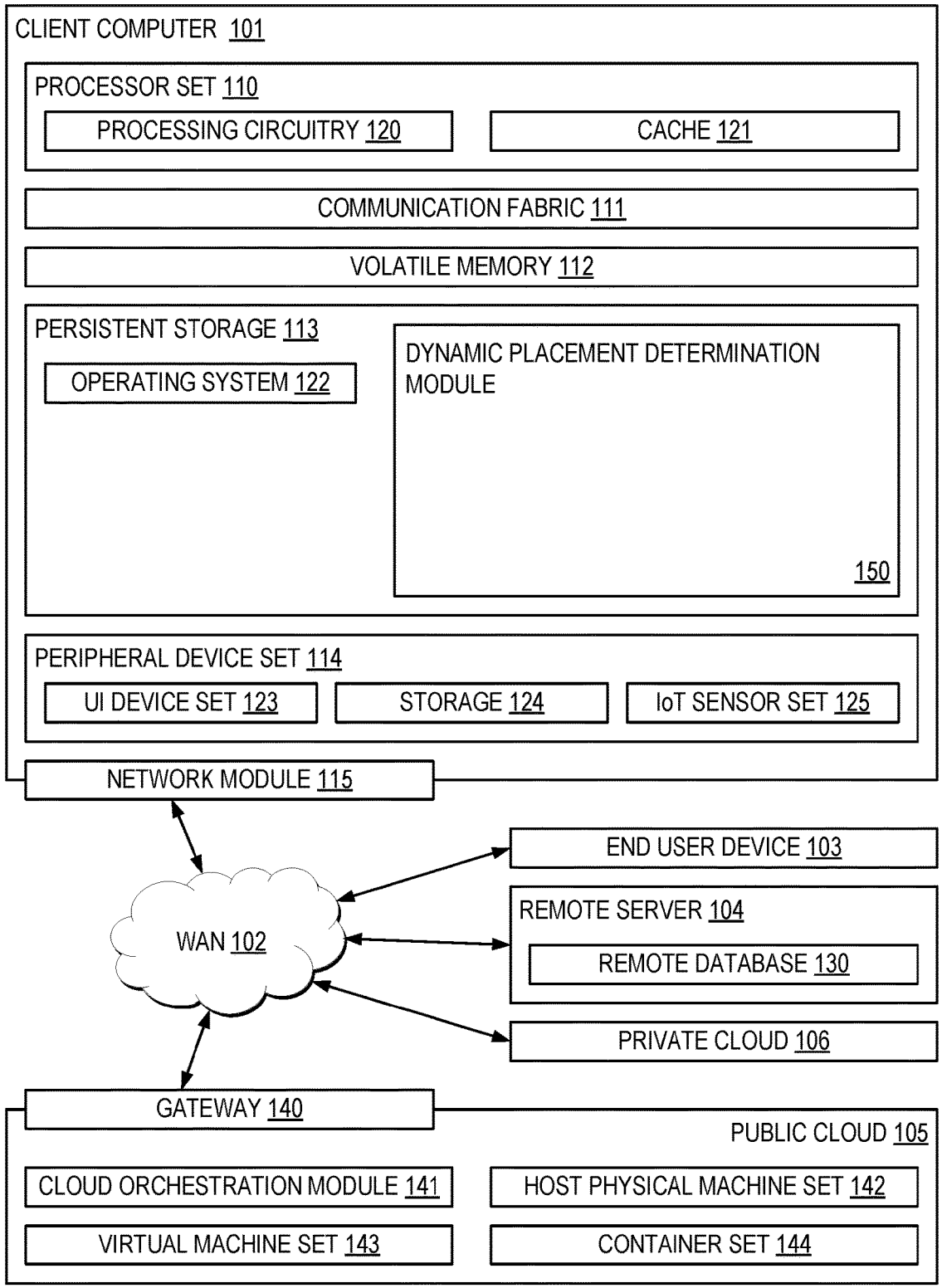
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for dynamically placing tasks into edge nodes based on reputation scores assigned to the tasks and reputation scores assigned to edge nodes.

In one general embodiment, a computer-implemented method includes dynamically assigning reputation scores to a plurality of tasks, and dynamically assigning reputation scores to a plurality of edge nodes. The method further includes dynamically placing the tasks into the edge nodes based on the reputation scores assigned to the tasks and the reputation scores assigned to the edge nodes.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as dynamic placement determination module of block 150 for dynamically placing tasks into edge nodes based on reputation scores assigned to the tasks and reputation scores assigned to edge nodes. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 2:
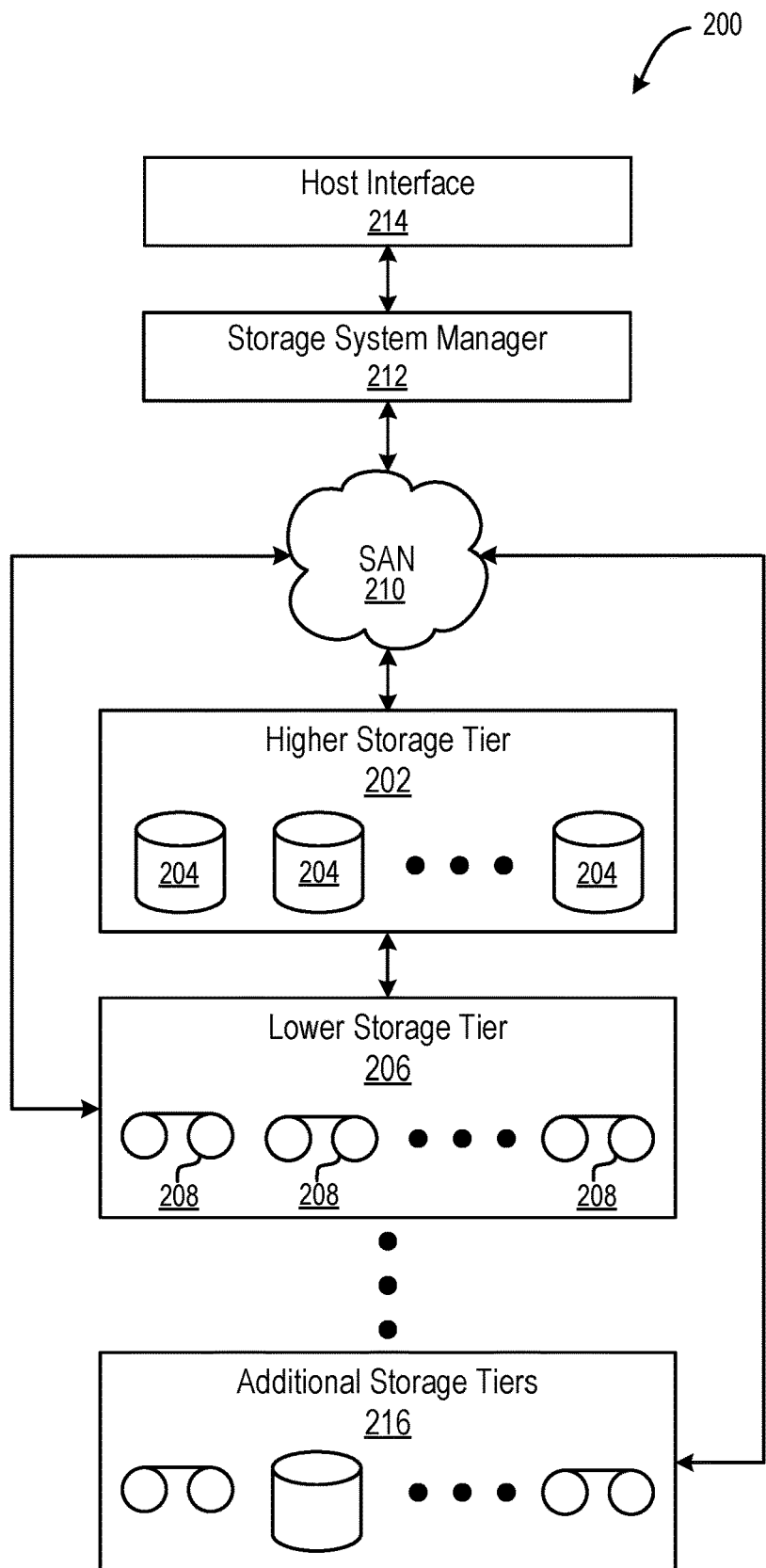
FIG. 2 is a diagram of a tiered data storage system, in accordance with one embodiment of the present invention.

Now referring to FIG. 2, a storage system 200 is shown, according to one embodiment. Note that some of the elements shown in FIG. 2 may be implemented as hardware and/or software, according to various embodiments. The storage system 200 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 200. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a storage area network (SAN), as shown in FIG. 2, or some other suitable network type. The storage system manager 212 may also communicate with one or more host systems (not shown) through a host interface 214, which may or may not be a part of the storage system manager 212. The storage system manager 212 and/or any other component of the storage system 200 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 200 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the embodiments presented herein.

According to some embodiments, the storage system (such as 200) may include logic configured to receive a request to open a data set, logic configured to determine if the requested data set is stored to a lower storage tier 206 of a tiered data storage system 200 in multiple associated portions, logic configured to move each associated portion of the requested data set to a higher storage tier 202 of the tiered data storage system 200, and logic configured to assemble the requested data set on the higher storage tier 202 of the tiered data storage system 200 from the associated portions.

Of course, this logic may be implemented as a method on any device and/or system or as a computer program product, according to various embodiments.

As mentioned elsewhere above, networks, which may include cloud computing networks, typically include a plurality of computing devices. For example, computing devices may include, e.g., computers, processors, phones, printers, controllable mechanisms, thermostats, sensors, etc.

Edge computing includes technologies and techniques that utilize computing resources that are available outside of traditional and cloud data centers such that a workload is placed closer to where data is created and such that actions can then be taken in response to an analysis of that data. For context, within an edge ecosystem, clouds, which may be public or private clouds, may serve as a repository for container-based workloads like applications and machine learning models. An edge device is a special-purpose piece of equipment that also has compute capacity that is integrated into that device. Furthermore, an edge node is a generic way of referring to any edge device, edge server, or edge gateway on which edge computing can be performed. Meanwhile, an edge cluster/server is a general-purpose IT computer that is located in a remote operations facility such as a factory, retail store, hotel, distribution center, or bank. Yet furthermore, an edge gateway is typically an edge cluster/server which, in addition to being able to host enterprise application workloads and shared services, also has services that perform network functions such as protocol translation, network termination, tunneling, firewall protection, or wireless connection.

By harnessing and managing the compute power that is available on remote premises, e.g., such as factories, retail stores, warehouses, hotels, distribution centers, vehicles, etc., developers are able to create applications that improve the performance of computer components, e.g., substantially reduce latencies, lower demands on network bandwidth, increase privacy of sensitive information, enable operations even when networks are disrupted, etc.

Edge computing may move relatively more computational power and resources closer to end users by increasing the number of endpoints and locating the endpoints relatively closer to the consumers, e.g., which may include the users or devices. Edge computing architectures are typically built on existing technologies and established paradigms for distributed systems, which means that there are many well understood components available to create the most effective architectures to build and deliver edge use cases. However, conventional implementations and techniques of edge computing are relatively problematic and inefficient because of the fact that edges can move around, e.g., based on some edge device being mobile such as a computer in a car, and based on the fact that tasks context can change, e.g., a relative importance and/or type of data associated with a given task being processed may change. Note that a "task" may be defined as a unit of execution or a unit of work. For example, tasks may include, e.g., a unit of execution within a job, a single step of processing a single item in a predetermined batch of items, a query, etc. In some approaches, a "task" may be synonymous with a "process" or a "thread." This is because these changes create problems in that edge placement algorithms are unable to handle following dynamic dimensions in these contexts. For example, assuming that a task is processing data and detecting evidence, e.g., such as evidence of a crime, upon the task beginning to identify evidence, a security level required for the task and an associated output may change. Accordingly, there may be a dynamic change in which the task is behaving, or an associated output based on the input and conventional placement methods cannot relatively efficiently consider this dimension. Instead, manual intervention and relatively extensive amounts of processing attempt to sort through this dimension. In another example, it may be considered that edge is unique in the case of a computing capacity context moving. Accordingly, upon a reputation score being based on a current context, the reputation score needs to be realigned based on the movement of the edge. Also, in some cases, edge capacity availability may itself change. Conventional placement methods significantly fail to include techniques that deal with these changes, e.g., there is a lack of consideration of what will happen after a period of time passing.

In sharp contrast, to the deficiencies described above, various embodiments and approaches described herein include dynamically placing tasks into edge nodes based on reputation scores assigned to the tasks and reputation scores assigned to edge nodes. This way, changes, e.g., such as those described above, are incorporated into the placement of tasks into edge nodes.

Figure 3:
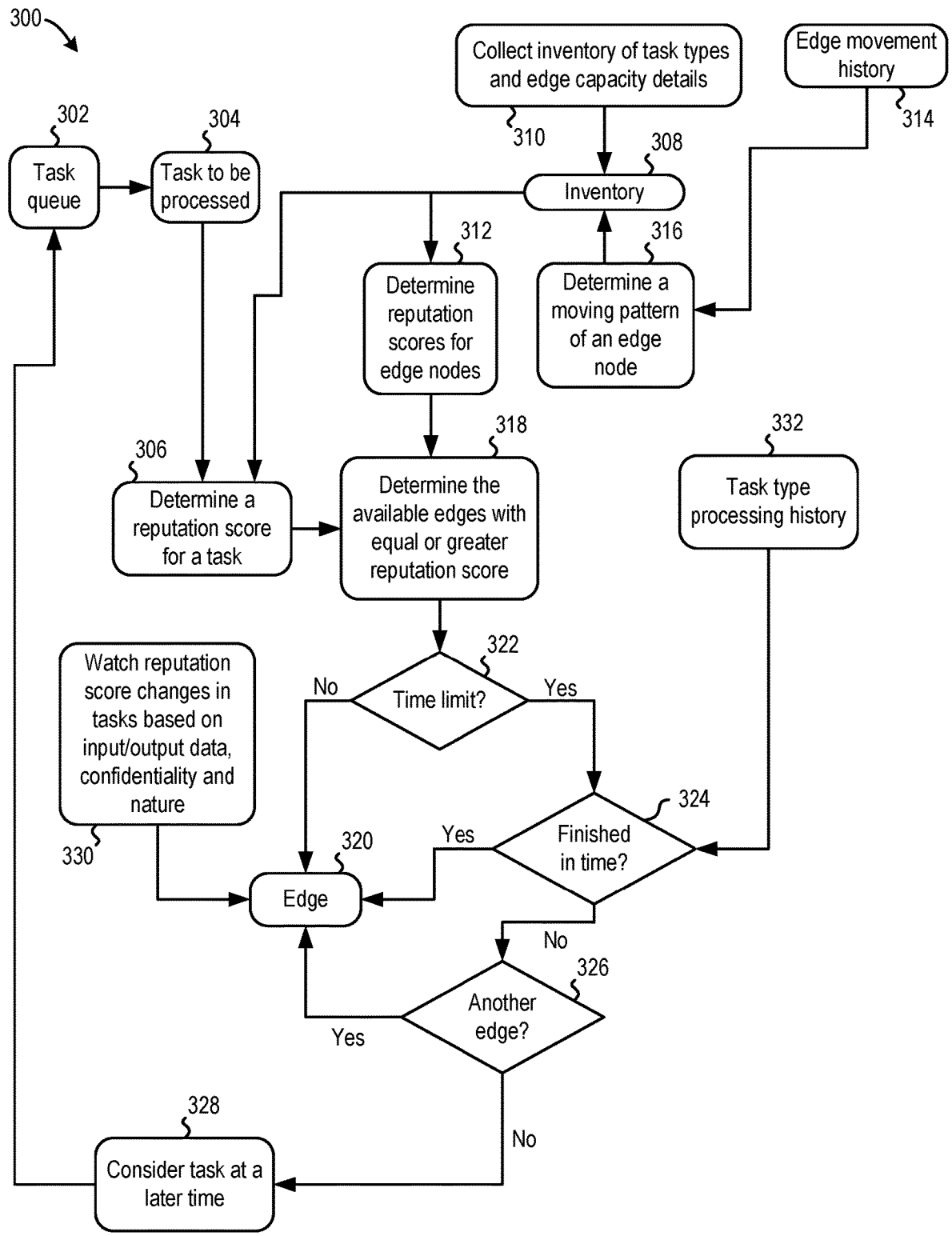
FIG. 3 is a flowchart of a method, in accordance with one embodiment of the present invention.

Now referring to FIG. 3, a flowchart of a method 300 is shown according to one embodiment. The method 300 may be performed in accordance with the present invention in any of the environments depicted in FIGS. 1-3, among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 300 may, in some approaches, be performed by a system that includes and/or receives information about tasks of a predetermined task queue, e.g., see task queue 302. Note that a "task" may be defined as a unit of execution or a unit of work. For example, tasks may include, e.g., a unit of execution within a job, a single step of processing a single item in a predetermined batch of items, a query, etc. In some approaches, a "task" may be synonymous with a "process" or a "thread." Illustrative non-limiting examples of tasks include, e.g., a step in a predetermined process of opening an application, processing confidential data, a unit of execution of a predetermined job, an instruction issued by a task manager component of a computer device, determining a count of a predetermined job execution program, confirming whether a signal is detected, switching a bit or flag that represents a state of data stored in a predetermined storage device, etc.

In some approaches, tasks that are to be processed may be added to the task queue. The task queue may, in some approaches, indicate and or output tasks that are to be processed, e.g., according to a first-in-first-out (FIFO) ordering, according to a first-in-last-out (FILO) ordering, etc. Accordingly, in some approaches, tasks that are to be processed are received, e.g., see operation 304. For context, tasks that are "to be processed" may refer to tasks that have not yet received a reputation score. As will be described in greater detail elsewhere herein, tasks may be assigned reputation scores to, at least in part, determine which edge node to place the task in for processing of the task.

Various parameters associated with task processing resources, e.g., such as edge nodes, may change at any given time. For context, this means that a first task may be placed into a first edge node that appears to be capable of processing the first task, e.g., based on the first edge node currently being available, but thereafter processing of the first task may fail to be completed based on the first edge node becoming unavailable, e.g., at least temporarily changing networks, during a period of time that processing the first task would otherwise have taken. For example, assuming that processing the first task takes over a minute of time for the first edge node to complete, in some approaches, processing of the first task by the first edge node may fail as a result of the first edge node changing networks in under a minute of time after the first task is placed in the first edge node. This situation leads to computer processing resources being wasted, e.g., processing performed by the first edge node on the first task does not result in a successful completion of the first task. As will be described below, in order to avoid such situations of computer processing resources being wasted, various operations of method 300 include dynamically assigning reputation scores to tasks and a plurality of edge nodes that are candidates for receiving the tasks. Note that these reputation scores may be of a predetermined range, e.g., one to two, zero to ten, one to one-hundred, etc.

In some approaches, method 300 includes dynamically assigning reputation scores to a plurality of tasks, e.g., see operation 306. For context, and as will become apparent upon reading the descriptions herein, these assignments are "dynamic" in that initial and/or current reputation scores of tasks may be ongoingly adjusted, e.g., reevaluated in response to a determination that a predetermined amount of time since a last task reputation score evaluation, in response to receiving a request, in response to a determination that performance of one or more networks that include the edge devices has fallen below a predetermined performance threshold. In one preferred approach, these assignments are "dynamic" in that initial and/or current reputation scores of tasks may be ongoingly adjusted according to changes in the various parameters associated with the tasks. For example, in some preferred approaches, dynamically assigning the reputation scores to the plurality of tasks includes adjusting the reputation score assigned to a first of the tasks in response to a determination that a predetermined parameter of input data and/or output data associated with the first task has changed. One or more of these parameters define a "context" of an environment and/or conditions of the edge nodes and/or the tasks. This context changes as a result of one or more of the parameters and, as will be described in greater detail below, may change an edge node that a task is or is scheduled to be assigned to. Monitoring for such changes may, in some approaches, be performed using techniques that would become apparent to one of ordinary skill in the art upon reading the descriptions herein, e.g., known techniques for monitoring the subject and/or type of input data and/or output data. In one of such approaches, the predetermined parameter includes a level of confidentiality of data that is being processed, e.g., as input and/or as output, in accordance with processing the first task. In some approaches, metadata of the task is inspected to determine such a degree of confidentiality of the data that is being processed in accordance with processing the first task. Tasks that are associated with a relatively greater degree of confidentiality, e.g., government data, patient medical care and/or records, encrypted data, a security key, data that is determined to be accessible to less than a predetermined threshold number of users, etc., may, in some approaches, be assigned a relatively greater reputation score than other tasks that are associated with a relatively lower degree of confidentiality, e.g., public data, data that is scheduled to be published, data that a user has indicated to be relatively low confidentiality, unencrypted data, data that is determined to be accessible to more than a predetermined threshold number of users, etc. In some other approaches, the predetermined parameter may additionally and/or alternatively be based on an owner of the data that is being processed, e.g., as input and/or as output, in accordance with processing the first task. For example, in response to a determination that the owner of the data that will be processed for a first task is, e.g., a paying customer, the government, non-profit groups, community outreach organizations, corporations subject to compliance rules and standards, etc., the first task may be assigned a relatively greater reputation score than other tasks that are determined to be associated with data that is owned by a, e.g., non-paying customer, non-government entity, corporation not subject to compliance rules and standards, etc. In some other approaches, the predetermined parameter may additionally and/or alternatively be based on whether the data associated with the first task is financial data, e.g., data related to taxes, numerical data, numerical data that is input into and/or output out of a predetermined type of algorithm, etc. In some of such approaches, the first task may be assigned a relatively greater reputation score in response to a determination that data associated with the first task includes financial data, and alternatively, the first task may be assigned a relatively lower reputation score in response to a determination that data associated with the first task does not include financial data.

In some approaches, the reputation scores assigned to a task are based on a plurality of parameters, e.g., a sum of a plurality of parameters, a product of a plurality of parameters, etc. In some of such approaches, a different predetermined hyperparameter may be applied to each of the parameters, e.g., in order to apply different predetermined weights to the parameters of some approaches in which the reputation is based on a plurality of parameters. Information, e.g., parameter information, used for determining the reputation scores of at least some of the tasks may be obtained and/or received from a predetermined inventory 308 that stores predetermined types of information, e.g., task types, predetermined parameter information, edge capacity details, available edge node capacities and performance capabilities, etc. An optional operation of method 300 includes collecting inventory of such information, e.g., see operation 310.

Operation 312 includes dynamically assigning reputation scores to a plurality of edge nodes. Similar to the dynamic assignment of reputation scores to the tasks, the assignment of reputation scores to the plurality of edge nodes is "dynamic" in that, in some approaches, initial and/or current reputation scores of at least some of the edge nodes may be ongoingly adjusted according to changes in the one or more parameters associated with the tasks. In some approaches, the reputation score of at least some of the edge nodes may be ongoingly adjusted based on information from the predetermined inventory 308. For example, in one or more of such approaches, information of the inventory may include edge movement history 314. During such movement, the edge node may connect to one or more networks and/or disconnect from one or more networks. For example, an edge node that is located in a computer of an automobile may be able to connect with a first network while the car is located at a first geographical location, and thereafter, not be able to connect to the first network but be able to connect to a second network while the car is located at a second geographical location. Another dimension within the context of network based parameters includes network bandwidth changes, which may increase or decrease processing potential of the edge nodes to process tasks placed therein. Accordingly, in some preferred approaches, dynamically assigning the reputation scores to the plurality of edge nodes includes adjusting the reputation score assigned to a first of the edge nodes in response to a determination that a predetermined parameter of a network that the first edge node is connected and/or is scheduled to connect to has changed.

One or more techniques for tracking the geographical location of the first edge node that would become apparent to one of ordinary skill in the art upon reading the descriptions herein may be used for such a dynamic assignment.

In some approaches, the predetermined parameter of the network may include a relative degree of secureness of the network. For example, various examples of security measures that may be considered indicative of a relatively secure network include, e.g., authentication requirements, encryption of the network and/or data therein, the network being hidden, a relatively strong password being required to gain access to the network, etc. Information used for determinations of reputation scores may, in some approaches, be determined from information of the inventory 308. In response to a determination that the first edge node is currently connected to a network that includes one or more security measures that are considered indicative of a relatively secure network, a relatively high reputation score may be assigned to the first edge node. Meanwhile, security measures that may be considered indicative of a relatively insecure network include, e.g., a lack of authentication requirements, the network and/or data associated with the network not being encrypted, the network being publicly discoverable, a relatively weak password or lack of password being required to gain access to the network, etc. In response to a determination that the first edge node is currently connected to a network that does not include a predetermined threshold of security measures, e.g., one, two, three, all, etc., that are considered indicative of a relatively secure network, a relatively low reputation score may be assigned to the first edge node.

In some other approaches, the predetermined parameter of the network may additionally and/or alternatively include an availability of backup resources, e.g., such as one or more backup edge nodes that can be swapped with the first edge node in response to the first edge node losing connection with a predetermined network. Task swapping may be caused, e.g., instructed, to be performed in response to a determination that task reputation scores and/or edge node reputation scores have changed. Information used for a determination of whether such backup resources are available may, in some approaches, be determined from the inventory and may be based on, e.g., edge node movement history, handshake information between edge nodes and the same predetermined connection point, etc. In response to a determination that the first edge node has at least a predetermined threshold extent of available backup resources, a relatively higher reputation score may be assigned to the first edge node. In contrast, in response to a determination that the first edge node does not have at least the predetermined threshold extent of available backup resources, a relatively lower reputation score may be assigned to the first edge node.

In some other approaches, the predetermined parameter of the network may additionally and/or alternatively include an owner of the network. For example, in some approaches, an owner of a network may specify information such as, e.g., scheduled downtime of the network, relative reliability of a network based on a history of the network, network traffic levels, etc. In some approaches, a relatively higher reputation score may be assigned to the first edge node in response to a determination that predetermined information associated with the network is disclosed by an owner of the network. In contrast, in response to a determination that such a disclosure has not been received and/or in response to a determination that predetermined other information associated with the network being unreliable is disclosed by the owner of the network, a relatively lower reputation score may be assigned to the first edge node.

The predetermined parameter of the network may additionally and/or alternatively be based on resource performance potential of the edge nodes and/or resources expected to be required to process the task. For example, in some approaches, indications of resource availability and capability may be received from one or more of the edge nodes. Furthermore, in some approaches, resources expected to be required to process a given task may be identified within information of the task type processing history 332 which may be added to the task type processing history 332 subsequent to each iteration of a task being processed by an edge node. Edge nodes determined to have relatively more resource availability and capability may be assigned relatively higher reputation scores, while edge nodes determined to have relatively less resource availability and capability may be assigned relatively lower reputation scores. Similarly, tasks determined to require relatively more resources to be processed may be assigned relatively higher reputation scores, while tasks determined to require relatively less resources to be processed may be assigned relatively lower reputation scores.

Edge node movement history may, in some approaches, be used to determine a moving pattern of an edge node, e.g., see operation 316. One or more pattern recognition techniques, that would become apparent to one of ordinary skill in the art upon reading the descriptions herein, may be used to determine the moving pattern based on information of the edge node movement history 314. For example, in some approaches, it may be determined whether any of the plurality of edge nodes are ever temporarily unavailable, e.g., associated with having a limited availability. For context, a temporary unavailability of an edge node may be based on the edge node moving outside of range of available networks, the edge node being scheduled for updating, etc. In response to a determination that a first of the edge nodes is temporarily unavailable, the reputation score of the first edge node may be based on the determined temporary unavailability. According to a more specific approach, basing the reputation score of the first edge node on the determined temporary unavailability may include setting the reputation score of the first edge node to a first predetermined value for a duration of time that the first edge node is available and/or setting the reputation score of the first edge node to a second predetermined value (where the first value and the second value are not the same) for a duration of time that the first edge node is unavailable. In some approaches, details about the durations of time and/or reputation scores associated therewith may be appended to and/or indicated in a packet that includes the task that is ultimately placed in an edge node. In another approach, the reputation score of the first edge node may be set to the first predetermined value for a duration of time that the first edge node is available, and thereafter, the reputation score of the first edge node may be adjusted to the second predetermined value in response to a determination that the first edge node becomes temporary unavailable. In yet another approach, the reputation score may be set to the first predetermined value for the period of time that the first edge node is determined to be available, and in response to a determination that the predetermined amount of time has passed, the reputation score of the first edge node may be reevaluated. In yet another approach, an illustrative example of dynamically assigning reputation scores of edge nodes based on movement may include lowering a reputation score currently assigned to an edge node in response to a determination that the edge node is moving from a relatively secure network to a relatively medium security network. Similarly, a reputation score currently assigned to an edge node may be increased in response to a determination that the edge node is moving towards a location where there are backup edges nearby, e.g., within a predetermined degree of proximity, to swap the tasks. Furthermore, in some approaches, reputation scores of edge nodes may be changed in response to a determination that new vulnerabilities are detected and/or in response to a determination that a security and compliance posture change of an edge device or a network associated with the edge device has occurred.

The tasks are dynamically placed into the edge nodes based on the reputation scores assigned to the tasks and the reputation scores assigned to the edge nodes, e.g., see operation 320. In order to determine which edge node to place a given task in, in some approaches, for each task, an available one of the edge nodes with an equal or greater reputation score than the reputation score assigned to the task is determined, e.g., see operation 318. In some cases, more than one edge node with such a reputation score may be determined. In one or more of such cases, the task may be assigned to an edge node having a relatively highest reputation score, a random one of the edge nodes determined to have an equal or greater reputation score than the reputation score assigned to the task, a first determined one of the edge nodes, to an edge node associated with a predetermined known task type that matches a task type of the task, etc. According to one illustrative example, a first of the tasks that is assigned a first reputation score may be identified. A first edge node that is assigned a second reputation score for a duration of time that the first edge node is available and a third reputation score for a duration of time that the first edge node is unavailable may additionally and/or alternatively be identified. It may be assumed in the current example, that the first reputation score matches the second reputation score but the first reputation score does not match the third reputation score. In some approaches, it may be determined whether the reputation score of the first task and/or the edge node is time dependent, e.g., see decision 322. In response to a determination that such reputation score(s) do not include a time limit and in response to a determination that a first of the edge nodes is available and has a reputation score that is equal to or greater than the reputation score assigned to the first task, the first task may be placed in the first edge node, e.g., see the "No" logical path of decision 322 continue to operation 320.

A determination may be made that the reputation score of the task and/or the edge node is time dependent, e.g., see "Yes" logical path of decision 322. Accordingly, a determination may additionally and/or alternatively be made as to whether the first task can be completed during the duration of time that the first edge node is available, e.g., see decision 322. Such a determination may be performed by using a known comparative technique to compare an expected processing time of the first task with the determined duration of time that the first edge node is available. Note that, in some approaches, the expected processing time of the first task of such a comparison may be determined based on historical information associated with prior processing of, e.g., the first task, similar tasks to the first task, other tasks by the first edge node, etc. For example, a predetermined collection of such historical information, e.g., see type task processing history 332 may be stored in a predetermined table that is accessed to make such a determination. In response to a determination that the first task can be completed during the duration of time that the first edge node is available, e.g., as illustrated by the "Yes" logical path of decision 324, the first task is placed into the first edge node. In contrast, in response to a determination that the first task cannot be completed during the duration of time that the first edge node is available, e.g., as illustrated by the "No" logical path of decision 324, the first task is optionally not placed into the first edge node. Instead, in some approaches, a determination may be made as to whether another edge node is available for placement of the first task, e.g., see decision 326. For example, it may be determined whether another edge node, e.g., a second edge node and optionally then a third edge node, etc., is assigned a reputation score that is equal or greater than the reputation score currently assigned to the first task. In response to a determination that another such edge node is available, e.g., as illustrated by the "Yes" logical path of decision 326, the first task is placed in the determined edge node. In contrast, in response to a determination that another such edge node is not available, e.g., as illustrated by the "No" logical path of decision 326, the first task is optionally considered at a later time, e.g., see operation 328. For example, the first task may be added to the task queue 302 and/or placed into a known type of hibernation state, and reconsidered after a predetermined amount of time.

In an alternative approach, in response to a determination that the first task cannot be completed during the duration of time that the first edge node is available, e.g., as illustrated by the "No" logical path of decision 324, the first task is optionally placed into the first edge node. This way, the first edge node is able to process the first task for the period of time that the first edge node is available. Upon a determination that the first edge node thereafter becomes unavailable, the partially completed task may be withdrawn from placement in the first edge node and added to the task queue 302, the reputation score of the first edge node may be withdrawn, and processing may be performed to ensure that the partially performed first task is completed may be initiated. For example, in such an approach, method 300 may include dynamically assigning a reputation score to the partially performed first task, which may thereafter be placed in a queue using techniques described above with respect to the initial previous placement of the first task. In yet another approach, an alternative to placing the partially performed first task in the task queue, may involve determining whether another edge node can take over for the first edge node for completing the partially performed first task, e.g., a second edge node that acts as a failover for the first edge node in response to a determination that the first edge node becomes unavailable. Note that the failover edge node or edge node that is determined to take over processing of the partially performed first task preferably has a reputation score that is equal to or greater than the current reputation score of the first task (which may be reevaluated subsequent to a determination being made that the first edge node has and/or will become unavailable).

In some approaches, a task may be withdrawn from an edge node that the task is placed in. For example, because the assignment of reputation scores is dynamically performed, monitoring may be performed for changes in one or more reputation scores that would cause, as a result of the change of the reputation score(s), a task to be processed by an edge node that the task should no longer be placed in. For example, operation 330 includes watching reputation score changes in tasks based on input/output data, confidentiality and nature. This way, it may be determined whether an edge node currently has a reputation score that is less than a reputation score of a task being processed in the edge node.

In some preferred approaches, dynamically placing the tasks into the edge nodes based on the reputation scores assigned to the tasks and the reputation scores assigned to the edge nodes includes determining, for each of the tasks, one of the edge nodes having a reputation score that is greater than or equal to the reputation score of the task, and dynamically placing the task into the determined edge node. This way, the edge node that is processing the task placed therein is ensured to be qualified to perform the task, e.g., as indicated by the reputation scores. Accordingly, in some approaches, in response to a determination that, as a result of reputation score changes, an edge node currently has a reputation score that is less than a reputation score of a task placed being processed in the edge node, the task may be withdrawn from the edge node, e.g., the edge node is instructed to stop processing associated with the task.

It should be noted that various operations described herein are described from a perspective of a "first" edge node and a "first" task for purposes of an illustrative example. In other words, these operations may additionally and/or alternatively be performed with respect to, e.g., a second edge node, a second task, any number of edge nodes, any number of tasks, etc. Furthermore, it should be noted that although various parameters for determining reputation scores are described herein, in some approaches, the reputation scores described herein may additionally and/or alternatively be assigned by predetermined users, e.g., an administrator of an edge computing environment that method 300 is performed in.

Various benefits are enabled as a result of implementing the techniques described in embodiments and approaches herein into edge computing environments. For example, as a result of dynamically placing the tasks into the edge nodes based on the reputation scores assigned to the tasks and the reputation scores assigned to the edge nodes, tasks are ensured to not be processed by edge nodes that do not have similar standards as the tasks, e.g., as defined by one or more of the parameters used to determine the reputation scores. This enables efficiencies in processing of computer related tasks because resources, e.g., edge nodes, that are processing the tasks are ensured to be suitable for doing so before the tasks are placed therein. Furthermore, the techniques described herein enable reductions in the number of computer operations that are performed in order to process tasks. This is because conventional techniques fail to dynamically assign reputation scores, and furthermore fail to base reputation scores based on considerations of whether edge nodes are determined to be at least temporarily unavailable at any point in time. Note that failing to perform such dynamic assignments and furthermore failing to consider such unavailability eventually results in at least some events of tasks being assigned to processing resources that thereafter fail to complete the tasks. This also results in troubleshooting and failure recovery processes being performed before again attempting to assign the tasks to a resource that appears available to process the task. These failure events, troubleshooting processes and failure recovery processes are avoided using the techniques described herein, because the availability of edge nodes is incorporated into the reputation scores and ongoing dynamic assignments. Accordingly, the inventive discoveries disclosed herein with regards to use of dynamically placing tasks into edge nodes based on reputation scores assigned to the tasks and reputation scores assigned to edge nodes proceed contrary to conventional wisdom.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
dynamically assigning first reputation scores to a plurality of tasks;
dynamically assigning second reputation scores to a plurality of edge nodes associated with a predetermined network; and
dynamically placing, within the predetermined network of an edge computing environment, the tasks into a first portion of the edge nodes based on the first reputation scores assigned to the tasks and the second reputation scores assigned to the first portion of the edge nodes,
wherein a result of the dynamic placement includes the tasks not being placed into a second portion of the edge nodes based on the second reputation scores assigned to the second portion of the edge nodes being based on a determined temporary unavailability of the second portion of the edge nodes,
wherein the dynamically assigning the second reputation scores comprises adjusting the second reputation score assigned to a first of the edge nodes in the first portion of the edge nodes in response to a determination that a relative degree of secureness of the first edge node in the first portion of the edge nodes changes.

2. The computer-implemented method of claim 1, wherein the dynamically assigning the first reputation scores to the plurality of tasks includes: adjusting the reputation score assigned to a first of the tasks in response to a determination that a predetermined parameter of input data and/or output data associated with the first task has changed.

3. The computer-implemented method of claim 2, wherein the predetermined parameter is selected from the group consisting of: a level of confidentiality, an owner of the input data and/or output data, and whether the input data and/or output data is financial data.

4. The computer-implemented method of claim 1, wherein the dynamically assigning the second reputation scores further comprises: adjusting the the second reputation score assigned to the first edge node in the first portion of the edge nodes in response to a determination that a predetermined parameter of the predetermined network has changed, wherein the first edge node is connected to the predetermined network.

5. The computer-implemented method of claim 4, wherein the predetermined parameter is an availability of backup resources or an owner of the predetermined network.

6. The computer-implemented method of claim 1, comprising: determining whether any of the plurality of edge nodes are ever temporarily unavailable; in response to a determination that the first edge node in the first portion of the edge nodes is temporarily unavailable, basing the reputation score of the first edge node in the first portion of the edge nodes on the determined temporary unavailability; and in response to a determination that a first edge node in the second portion of the edge nodes is temporarily unavailable, basing the reputation score of the first edge node in the second portion of the edge nodes on the determined temporary unavailability.

7. The computer-implemented method of claim 6, wherein basing the reputation score of the first edge node in the first portion of the edge nodes on the determined temporary unavailability includes: setting the reputation score of the first edge node in the first portion of the edge nodes to a first value for a duration of time that the first edge node in the first portion of the edge nodes is available, and adjusting the reputation score of the first edge node in the first portion of the edge nodes to a second value in response to a determination that the first edge node in the first portion of the edge nodes becomes temporary unavailable.

8. The computer-implemented method of claim 6, wherein the dynamically placing, within the predetermined network, the tasks into the edge nodes associated with the predetermined network includes: identifying a first of the tasks that is assigned a first reputation score; identifying a second edge node in the first portion of the edge nodes that is assigned a second reputation score for a duration of time that the first edge node in the first portion of the edge nodes is available and a third reputation score for a duration of time that the first edge node in the first portion of the edge nodes is unavailable; wherein the first reputation score matches the second reputation score; determining whether the first task can be completed during the duration of time that the first edge node in the first portion of the edge nodes is available; in response to a determination that the first task can be completed during the duration of time that the first edge node in the first portion of the edge nodes is available, placing the first task into the first edge node in the first portion of the edge nodes; and in response to a determination that the first task cannot be completed during the duration of time that the first edge node in the first portion of the edge nodes is available, not placing the first task into the first edge node in the first portion of the edge nodes.

9. The computer-implemented method of claim 6, wherein the dynamically placing, within the predetermined network, the tasks into the edge nodes based on the first reputation scores assigned to the tasks and the second reputation scores assigned to the edge nodes includes: determining, for each of the tasks, one of the edge nodes having a reputation score that is greater than or equal to the reputation score of the task; and dynamically placing the task into the determined edge node.

10. A computer program product, the computer program product comprising a non-transitory computer readable storage medium having program instructions embodied therewith, the program instructions readable and/or executable by a computer to cause the computer to:
dynamically assign, by the computer, first reputation scores to a plurality of tasks;
dynamically assign, by the computer, second reputation scores to a plurality of edge nodes associated with a predetermined network; and
dynamically place, by the computer, within the predetermined network of an edge computing environment, the tasks into a first portion of the edge nodes based on the first reputation scores assigned to the tasks and the second reputation scores assigned to the first portion of the edge nodes,
wherein a result of the dynamic placement includes the tasks not being placed into a second portion of the edge nodes based on the second reputation scores assigned to the second portion of the edge nodes being based on a determined temporary unavailability of the second portion of the edge nodes,
wherein the dynamically assigning the second reputation scores comprises adjusting the second reputation score assigned to a first of the edge nodes in the first portion of the edge nodes in response to a determination that a relative degree of secureness of the first edge node in the first portion of the edge nodes changes.

11. The computer program product of claim 10, wherein the dynamically assigning the first reputation scores to the plurality of tasks includes: adjusting the reputation score assigned to a first of the tasks in response to a determination that a predetermined parameter of input data and/or output data associated with the first task has changed.

12. The computer program product of claim 11, wherein the predetermined parameter is selected from the group consisting of: a level of confidentiality, an owner of the input data and/or output data, and whether the input data and/or output data is financial data.

13. The computer program product of claim 10, wherein the dynamically assigning the second reputation scores further comprises: adjusting the the second reputation score assigned to the first edge node in the first portion of the edge nodes in response to a determination that a predetermined parameter of the predetermined network has changed, wherein the first edge node is connected to the predetermined network.

14. The computer program product of claim 13, wherein the predetermined parameter is an availability of backup resources or an owner of the predetermined network.

15. The computer program product of claim 10, comprising: the program instructions readable and/or executable by the computer to cause the computer to: determine, by the computer, whether any of the plurality of edge nodes are ever temporarily unavailable; in response to a determination that the first edge node in the first portion of the edge nodes is temporarily unavailable, base, by the computer, the reputation score of the first edge node in the first portion of the edge nodes on the determined temporary unavailability; and in response to a determination that a first edge node in the second portion of the edge nodes is temporarily unavailable, base, by the computer, the reputation score of the first edge node in the second portion of the edge nodes on the determined temporary unavailability.

16. The computer program product of claim 15, wherein basing the reputation score of the first edge node in the first portion of the edge nodes on the determined temporary unavailability includes: setting the reputation score of the first edge node in the first portion of the edge nodes to a first value for a duration of time that the first edge node in the first portion of the edge nodes is available, and adjusting the reputation score of the first edge node in the first portion of the edge nodes to a second value in response to a determination that the first edge node in the first portion of the edge nodes becomes temporary unavailable.

17. The computer program product of claim 15, wherein the dynamically placing, within the predetermined network, the tasks into the edge nodes associated with the predetermined network includes: identifying a first of the tasks that is assigned a first reputation score; identifying a second edge node in the first portion of the edge nodes that is assigned a second reputation score for a duration of time that the first edge node is available and a third reputation score for a duration of time that the first edge node in the first portion of the edge nodes is unavailable; wherein the first reputation score matches the second reputation score; determining whether the first task can be completed during the duration of time that the first edge node in the first portion of the edge nodes is available; in response to a determination that the first task can be completed during the duration of time that the first edge node in the first portion of the edge nodes is available, placing the first task into the first edge node in the first portion of the edge nodes; and in response to a determination that the first task cannot be completed during the duration of time that the first edge node in the first portion of the edge nodes is available, not placing the first task into the first edge node in the first portion of the edge nodes.

18. The computer program product of claim 15, wherein the dynamically placing, within the predetermined network, the tasks into the edge nodes based on the first reputation scores assigned to the tasks and the second reputation scores assigned to the edge nodes includes: determining, for each of the tasks, one of the edge nodes having a reputation score that is greater than or equal to the reputation score of the task; and dynamically placing the task into the determined edge node.

19. A system, comprising:
a plurality of edge nodes;
a processor; and
logic integrated with the processor, executable by the processor, or integrated with and executable by the processor, the logic being configured to:
dynamically assign first reputation scores to a plurality of tasks;
dynamically assign second reputation scores to the plurality of edge nodes associated with a predetermined network; and
dynamically place, within the predetermined network of an edge computing environment, the tasks into a first portion of the edge nodes based on the first reputation scores assigned to the tasks and the second reputation scores assigned to the first portion of the edge nodes,
wherein a result of the dynamic placement includes the tasks not being placed into a second portion of the edge nodes based on the second reputation scores assigned to the second portion of the edge nodes being based on a determined temporary unavailability of the second portion of the edge nodes,
wherein the dynamically assigning the second reputation scores comprises adjusting the second reputation score assigned to a first of the edge nodes in the first portion of the edge nodes in response to a determination that a relative degree of secureness of the first edge node in the first portion of the edge nodes changes.

20. The system of claim 19, wherein the dynamically assigning the first reputation scores to the plurality of tasks includes: adjusting the reputation score assigned to a first of the tasks in response to a determination that a predetermined parameter of input data and/or output data associated with the first task has changed.

* * * * *